2,818,658

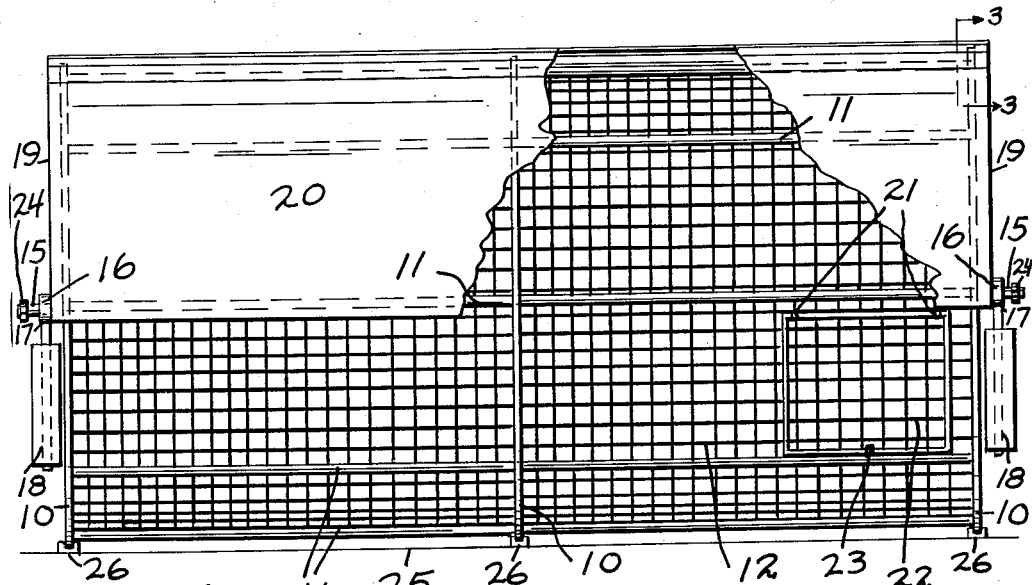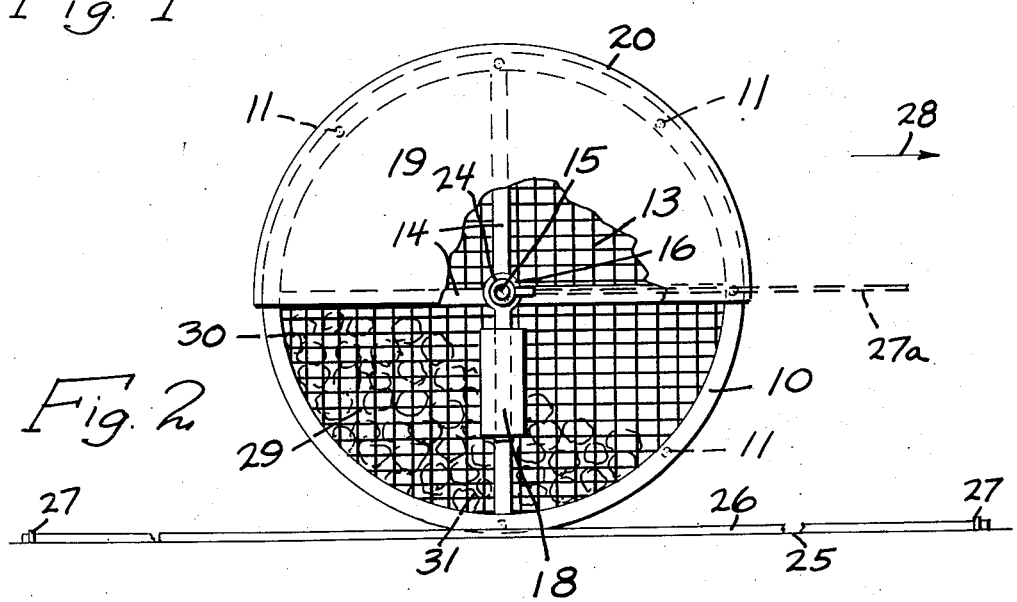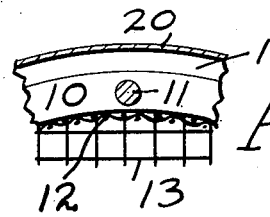

CYLINDRICAL ROLLING CORN CRIB

Frank L. Barnes, Sioux Falls, S. Dak.

Application July 30, 1954, Serial No. 446,779

2 Claims. (Cl. 34—126)

My invention relates to a corn crib.

An object of my invention is to provide a certain type of corn crib which crib will allow for the convenient and efficient drying of the corn therein.

A further object of my invention is to provide a certain structure in which the corn crib is normally positioned horizontally, and is of such structure to provide means wherein the crib can be rolled in a direction at right angles to its axis and along the ground or other surface to thereby provide means wherein the material within the crib will be exposed to the air as the device is rolled forwardly until all of the material is exposed.

A further object of my invention is to provide a very simple structure to accomplish the above results.

A further object of my invention is to provide means for protecting the interior of the crib against rain or other elements.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a forward elevation of the device,

Figure 2 is an end view of Figure 1, and

Figure 3 is an enlarged detail taken along the lines 3—3 of Figure 1.

The usual corn cribs of the vertically positioned type in which the crib is in a cylindrical form and with its axis being positioned vertically, does not satisfactorily allow the corn or other products within the crib to be sufficiently aerated, therefore resulting in dense and wet masses of corn at the bottom of the crib, and in those cases wherein the ears are heated, there is a definite loss of food elements or minerals, the heating process itself being relatively expensive, and it is the principal objective of my invention to provide means for drying the corn within the crib without the necessity of resorting to cumbersome methods.

In describing my invention I have used the character 10 to designate cylindrical rings which are spaced apart as shown and to which are rigidly attached the bracing rods 11, these rods being spaced circumferentially as shown and thereby providing a rigid structure.

Suitably attached within this cage-like structure is the cylindrical wire mesh member 12 and the end wire mesh members 13, this arangement thereby providing a complete cylindrical crib in which the contents thereof will be enclosed by the wire mesh members described.

Also bracing the end rings 10 are the cross brace members 14 which join at the center, and suitably attached to these members 14 are the short shafts 15 to which are attached the hubs 16, and secured at 17 to the hubs 16 are the downwardly projecting weighted units 18. Also attached to the hubs 16 are the side portions 19 of a shield member also having the arcuate upper semi-cylindrical member 20, the members 19 and 20 being made of relatively light material so that the counterweights 18 will maintain the shield in upper position at all times.

Hinged at 21 is the mesh door 22 which can be locked at 23. Also journaled on the ends of the shafts 15 are the small yoke members 24. The character 25 designates the ground surface, and preferably I employ the channel members 26 which are suitably secured as at 27 to the ground, the rings 10 being adapted to roll within the channels 26, it being understood however that the device can also be rolled along the ground surface if desired or anyother surface.

The device operates in the following manner: The cylindrical mesh can be partially filled through the door member 22 with the door being positioned at a higher elevation than shown, and if desired the counterweights 18 can be swung a certain amount to allow the door to be opened at a higher elevation whereby the ears of corn are then poured into the crib, or if such is desired, the shield 20 can include a door portion which will register with the door 22. A pair of lines 27a can be attached to the yokes 24, these lines being attached to a suitable drawing vehicle such as a tractor or the like, or the device can be pulled in any other desired manner. The arrangement is then pulled in the direction of the arrow 28 (see Figure 2) and it will be noted that the ears of corn designated by the character 29 and by dotted structures will be gradually exposed to the air during the rotation of the arrangement as it rolls along the channels 26, the ears at 30 being exposed to the air, and during continued rotation the lower ears 31 are also exposed. At the same time certain of the ears will gravitate downwardly and during the rolling action these ears will come in contact with sufficient air to dry the same. The rotation of the crib can be made as gradually as desired in order to effect the aerated properties, and it will thus be noted that all of the surfaces of the various ears will be exposed to the open air thereby rendering the ears dry in an efficient manner. The device can be rolled in either direction as desired, and it will be noted that the shield portions 19 and 20 will remain at the upper part of the arrangement to protect the contents of the crib against rain and the like. It will also be obvious that other products could be placed in the crib and dried in the same manner, and the door 22 can be placed at a lower position and opened so that the contents will gravitate downwardly and out through the door when such is desired.

It should be obvious that other modifications could be made in my invention without departing however from the essential spirit and purpose of my invention which is that of a rolling cylindrical crib wherein the entire crib itself is rolled along a suitable surface to thereby selectively expose the interior contents thereof to the air for drying purposes.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A cylindrical rolling corn crib comprising a crib member of substantially cylindrical shape, said crib having a plurality of openings exposed to the outer air, said crib being adapted to be rolled in a direction substantially at right angles to its longitudinal laterally positioned axis, said crib member including a door, a shield member for protecting the contents of said crib member against weather conditions including an arcuate shield enclosing an upper portion of said crib member, counter-balances attached to said arcuate shield to maintain said shield in an upper position when said crib member is rolled shafts attached at the ends of said crib and extending axially thereof, said shields being rotatably mounted on said shafts.

2. A cylindrical rolling corn crib comprising a substantially cylindrical crib formed of wire mesh for containing products to be dried therein, said crib being positioned so that its longitudinal axis is horizontal and lateral whereby movement of said crib in a direction at right angles to its longitudinal axis will successively raise such material to air-contacting positions, said crib including a pluralty of spaced rigid rings attached to said crib, a plurality of horizontally positioned brace rods attached to said rings, channel members in which said rings are received and in which said rings roll, a shield member covering an upper portion of said crib, counterbalancing means attached to said shield member to maintain the same in upper position when said crib is rolled shafts attached at the ends of said crib and extending axially thereof, said shields being rotatably mounted on said shafts.

References Cited in the file of this patent

UNITED STATES PATENTS

| | | |
|---|---|---|
| 66,559 | Burt | July 9, 1867 |
| 1,284,007 | Whitcomb | Nov. 5, 1918 |
| 2,527,826 | Kooman | Oct. 31, 1950 |